US011696149B2

(12) United States Patent
Jain (10) Patent No.: US 11,696,149 B2
(45) Date of Patent: Jul. 4, 2023

(54) SYSTEMS AND METHODS FOR OPTIMAL OVER-THE-AIR ANTENNA INSTALLATION (71) Applicant: Sling TV L.L.C., Englewood, CO (US)

(72) Inventor: Vikal Kumar Jain, Foster City, CA (US)

(73) Assignee: Sling TV L.L.C., Englewood, CO (US)

( * ) Notice: Subject to any disclaimer, the term of this patent is extended or adjusted under 35 U.S.C. 154(b) by 0 days.

(21) Appl. No.: 17/210,214

(22) Filed: Mar. 23, 2021

(65) Prior Publication Data
US 2022/0312222 A1  Sep. 29, 2022

(51) Int. Cl.
*H04W 16/18* (2009.01)
*H04B 17/309* (2015.01)
*H04W 4/021* (2018.01)

(52) U.S. Cl.
CPC .......... *H04W 16/18* (2013.01); *H04B 17/309* (2015.01); *H04W 4/021* (2013.01)

(58) Field of Classification Search
CPC ..... H04W 4/021; H04W 4/023; H04W 4/029; H04W 4/06; H04W 16/18; H04W 16/20; H04B 17/24; H04B 17/26; H04B 17/27; H04B 17/309; H04B 17/318; H04B 17/373
See application file for complete search history.

(56) References Cited

U.S. PATENT DOCUMENTS

| 5,933,123 A | * | 8/1999 | Kaul | H01Q 7/02 343/890 |
| 9,479,837 B1 | * | 10/2016 | Rothaus | H04N 21/6168 |
| 9,532,097 B1 | * | 12/2016 | Chen | H04N 21/42204 |
| 10,694,388 B2 | * | 6/2020 | Liang | H04W 76/14 |
| 10,831,210 B1 | * | 11/2020 | Kobilarov | B60W 60/0011 |
| 11,082,736 B2 | * | 8/2021 | Yao | H04N 21/44204 |
| 11,367,356 B1 | * | 6/2022 | Ketharaju | G06Q 20/204 |
| 2004/0198279 A1 | * | 10/2004 | Anttila | G06Q 30/06 455/179.1 |
| 2006/0020988 A1 | * | 1/2006 | Takagi | H01Q 1/1257 725/62 |
| 2007/0112575 A1 | * | 5/2007 | Savoor | H04N 21/23 705/7.34 |
| 2010/0014003 A1 | * | 1/2010 | Chang | H04N 21/4126 348/731 |

(Continued)

*Primary Examiner* — Jean A Gelin
(74) *Attorney, Agent, or Firm* — Perkins Coie LLP (57) ABSTRACT Examples of the present disclosure describe systems and methods for locating an optimal installation location for an over-the-air (OTA) antenna. In some example aspects, the system described herein may receive a list of preferred local channels and/or programs from a user. The system may then compare those channels and/or programs to at least one database that comprises channel frequencies based on a user's geolocation (e.g., GPS coordinates, address, zip code, etc.). Based on the comparison of the preferred channels and/or programs, the system may suggest a certain installation location of an OTA antenna. The system may evaluate broadcast signals received by the OTA antenna to determine the strength of the signals at the present OTA antenna location. The results of the channel feedback analysis may be displayed in real-time (or near real-time) on a mobile device, indicating to the user if the present location is an optimal installation location.

19 Claims, 8 Drawing Sheets (56) References Cited

U.S. PATENT DOCUMENTS

| | | | | |
|---|---|---|---|---|
| 2011/0154401 | A1* | 6/2011 | Chow | H04N 21/4821 |
| | | | | 725/100 |
| 2013/0183961 | A1* | 7/2013 | Bassiri | H04W 16/20 |
| | | | | 455/446 |
| 2013/0227619 | A1* | 8/2013 | Lewis | H01Q 1/44 |
| | | | | 348/E5.113 |
| 2014/0146239 | A1* | 5/2014 | Guillen | H04N 21/25841 |
| | | | | 348/731 |
| 2015/0349905 | A1* | 12/2015 | Thomas | H04H 60/15 |
| | | | | 455/414.3 |
| 2017/0171582 | A1* | 6/2017 | Langer | H04N 21/4382 |
| 2018/0316953 | A1* | 11/2018 | Freeman | H04N 21/440218 |
| 2019/0187702 | A1* | 6/2019 | Herbach | G06Q 10/047 |
| 2019/0208259 | A1* | 7/2019 | Chaudhari | H04N 21/2747 |
| 2019/0208265 | A1* | 7/2019 | Chatwin | H04N 21/2143 |
| 2020/0412026 | A1* | 12/2020 | Bhavnagari | H01Q 5/385 |
| 2021/0111821 | A1* | 4/2021 | Petruzzelli | H04W 4/025 |
| 2021/0197819 | A1* | 7/2021 | Okamoto | B60W 40/04 |
| 2021/0289366 | A1* | 9/2021 | Ginis | H04W 24/02 |
| 2021/0297166 | A1* | 9/2021 | Basavarajappa | H04B 17/16 |
| 2021/0367692 | A1* | 11/2021 | Jain | H04N 21/482 |
| 2021/0373566 | A1* | 12/2021 | Agarwal | G05D 1/0223 |
| 2022/0103216 | A1* | 3/2022 | Dhulipalla | H04B 7/0814 |

* cited by examiner

SYSTEMS AND METHODS FOR OPTIMAL OVER-THE-AIR ANTENNA INSTALLATION

TECHNICAL FIELD

The present disclosure relates to the field of multimedia content streaming and over-the-air broadcasting and programming.

BACKGROUND

Over-the-air ("OTA") television is a term used to describe television signals that are broadcast by local television broadcast towers, as opposed to a cable or satellite signal. To receive these OTA channels, users typically have one of three options. A user can purchase an OTA digital receiver with tuners affixed to the receiver. A user could purchase an HDTV with a built-in tuner. Or a user could use an HD satellite tuner, for example, in the form of an HDTV satellite receiver with an OTA tuner built into the same unit. In other examples, a device like AirTV® may be used to receive OTA programming.

In any of these configurations, before the user can watch OTA channels, the user must setup the necessary equipment. Presently, the current method of setting up the OTA hardware requires the user to use a "guess-and-check" method of installing the OTA antenna to locate the best position relative to the OTA box and broadcast towers. Most commercial equipment manufacturers suggest users place the antenna on a window (if it's an indoor antenna) or away from obstructions (if it's an outdoor antenna). Once the antenna is installed, the user must then check the television to assess the reception quality. If the user is expecting to receive a certain number of local channels but only a subset of those channels is being received by the OTA antenna, then the user can deduce that the antenna is not in an optimal location. The user must then repeat the same guess-and-check process over and over again until the user finds the optimal location to install the antenna that allows the user to receive all the local channels available in the user's geographic area.

This guess-and-check method of finding the optimal location to install an OTA antenna is cumbersome, time-consuming, and inefficient. Additionally, many users of OTA equipment will "quit" after a couple tries and simply be content with a suboptimal OTA antenna installation location (i.e., the user simply accepts that not all local channels are available based on the current installation location of the OTA antenna rather than try to install the OTA antenna in a different location). Furthermore, some users are only interested in accessing certain local channels rather than all of the available local channels in a certain area. Through the current guess-and-check method of OTA antenna installation, the user is not guaranteed to receive the preferred local channels at any given OTA antenna location. For example, in one location, the user may only receive preferred local channels A, B, and C. But in another location, the user may only receive preferred local channels A, B, and D.

Similarly, a user may be interested in obtaining access to certain programs regardless of channel. Current OTA television solutions fail to provide this level of programming data to the user. For a user to figure out which channels broadcast a user's favorite television shows, the user is forced to look this information up separately, note the local channels that broadcast the user's favorite television shows, and then attempt to place the antenna (via the guess-and-check method) in a location that allows the user to receive those particular channels. Again, this is a time-consuming and cumbersome process.

As such, there is an increased need for systems and methods that can efficiently address the challenges of finding the most optimal location to install an OTA antenna based on a user's channel and programming preferences.

It is with respect to these and other general considerations that the aspects disclosed herein have been made. Also, although relatively specific problems may be discussed, it should be understood that the examples should not be limited to solving the specific problems identified in the background or elsewhere in the disclosure.

BRIEF DESCRIPTION OF THE DRAWINGS

Non-limiting and non-exhaustive examples are described with reference to the following figures.

DETAILED DESCRIPTION

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entirely software implementation or an implementation combining software and hardware aspects. The following detailed description is, therefore, not to be taken in a limiting sense.

Embodiments of the present application are directed at systems and methods for identifying an optimal location to install an OTA antenna. To identify an optimal location to install an OTA antenna, the systems and methods described herein are directed at receiving OTA channel feedback in real-time (or near real-time) and providing the OTA channel feedback data directly to the user to inform the user of the best location to install the OTA antenna. By providing the user with fast results regarding the OTA channel reception quality, the user is able to efficiently locate an optimal location to install the OTA antenna, avoiding the current time-consuming and cumbersome process of guessing-and-checking the OTA antenna location for optimal OTA channel reception quality.

Specifically, the systems and methods described herein are directed to receiving channel and/or program preferences from a user. For example, a user may provide the system with a list of preferred local channels or preferred television shows. The system may then save that information and compare it against at least one database. The at least one database may be a database that cross-references local channels based on geographic location (e.g., ZIP code) and broadcast frequencies (e.g., between 54 and 216 MHz for Very High Frequency (VHF), and 470 and 890 MHz for Ultra High Frequency (UHF)). Additionally, the at least one database may also comprise data related to the geolocations of proximal broadcast towers and points-of-interest (POIs) nearby the broadcast towers. Such POIs may be used to inform the user of a predicted optimal location to install an OTA antenna (e.g., install the OTA antenna on the side of the house facing the city). In further embodiments, the at least one database may comprise certain geocoordinates (e.g., latitude and longitude) that have historically produced successful installation locations for OTA antennas (i.e., had strong average signal strength at the particular locations). Such geocoordinates may be provided to the user prior to the user installing the OTA antenna and other related hardware.

Once the OTA antenna is in a location for a certain duration, the system may run an automatic channel feedback check to assess the channel reception quality at the present location of the OTA antenna. In other embodiments, a user may manually activate this check at a certain location. A user may receive the results from the channel feedback check on a device (e.g., mobile device, tablet, computer, etc.), informing the user of which channels and/or programs are able to be received OTA at that particular OTA antenna location. Based on the quality of the channel reception at a certain OTA antenna location, the system may suggest to the user to try a different location (e.g., if channel reception quality is low) or to install the OTA antenna permanently at the current location (e.g., if the channel reception quality is high).

In some embodiments, a delay may occur in receiving the channel feedback results based on the current location of the OTA antenna. The system may store the current geocoordinates of the OTA antenna during the channel feedback check and provide that information to the user at a later time, if the particular location the OTA antenna was previously in was an optimal OTA antenna location. In other words, if certain channel feedback results are not immediately available to the user, the system may provide those results at a later time, informing the user where to install the OTA antenna to obtain optimal channel reception coverage.

In another example, the systems and methods described herein are directed to identifying an optimal OTA antenna installation location using an autonomous vehicle (e.g., a robot, drone, etc.). Rather than the user physically moving around an area to install an OTA antenna, an autonomous vehicle containing the OTA antenna can move around an area autonomously, automatically checking channel reception quality at each location. Once an optimal location is discovered, the autonomous vehicle may be equipped to install the OTA antenna itself or may alert the user to the present location for manual install.

In other examples, the graphical user interface (GUI) of the channel feedback results may indicate to the user enriched metadata associated with the local channels that are available for broadcast. Such enriched metadata may include the full name of a channel, top trending programs (television shows) on that channel, and a channel logo, among other metadata. Such enriched metadata may allow a user to more quickly find an optimal location to install an OTA antenna. For instance, if a user desired to have access to four local channels because of the television shows each of the four local channels broadcasted, a user may seek to install an OTA antenna in a location that has strong reception for each of these four local channels. During the installation process, however, a user may perceive that one of the channels has low reception in a certain location while the other three channels have strong reception. The user may analyze the enriched data associated with these four channels and discover that two of the channels have overlapping programming, meaning that the television show the user may have wanted to watch on the channel with low reception is also being broadcasted on one of the other local channels with strong reception. As such, the user may opt to install the OTA antenna at the present location, knowing that the user will not miss out on any specific programming due to the information provided through the metadata on the GUI.

In yet other example aspects, a user that may want to view a certain television show on a particular local channel may be unable to view the local channel due to poor reception via the OTA antenna. In such an instance, the system described herein may be equipped to display to the user on a device different options to view the desired television show (e.g., a pop-up on a mobile device). Such options may include WiFi streaming and/or satellite television options. Specifically, a provider that offers both OTA television options and Internet streaming options could provide different viewing options to the user based on the availability of certain local channels. If a local channel is unavailable, the certain programming may be available via the Internet streaming service, and the user may have the option of switching over to the Internet streaming service at that time or purchasing (and subscribing) to that service via the user's device.

The techniques disclosed herein increase the efficiency of installing an OTA antenna and the optimality of the OTA antenna location. The systems and methods improve the technical functionality of the OTA antenna and associated hardware by maximizing the hardware's potential based on the identified optimal location of installation of the OTA antenna.

Figure 1:
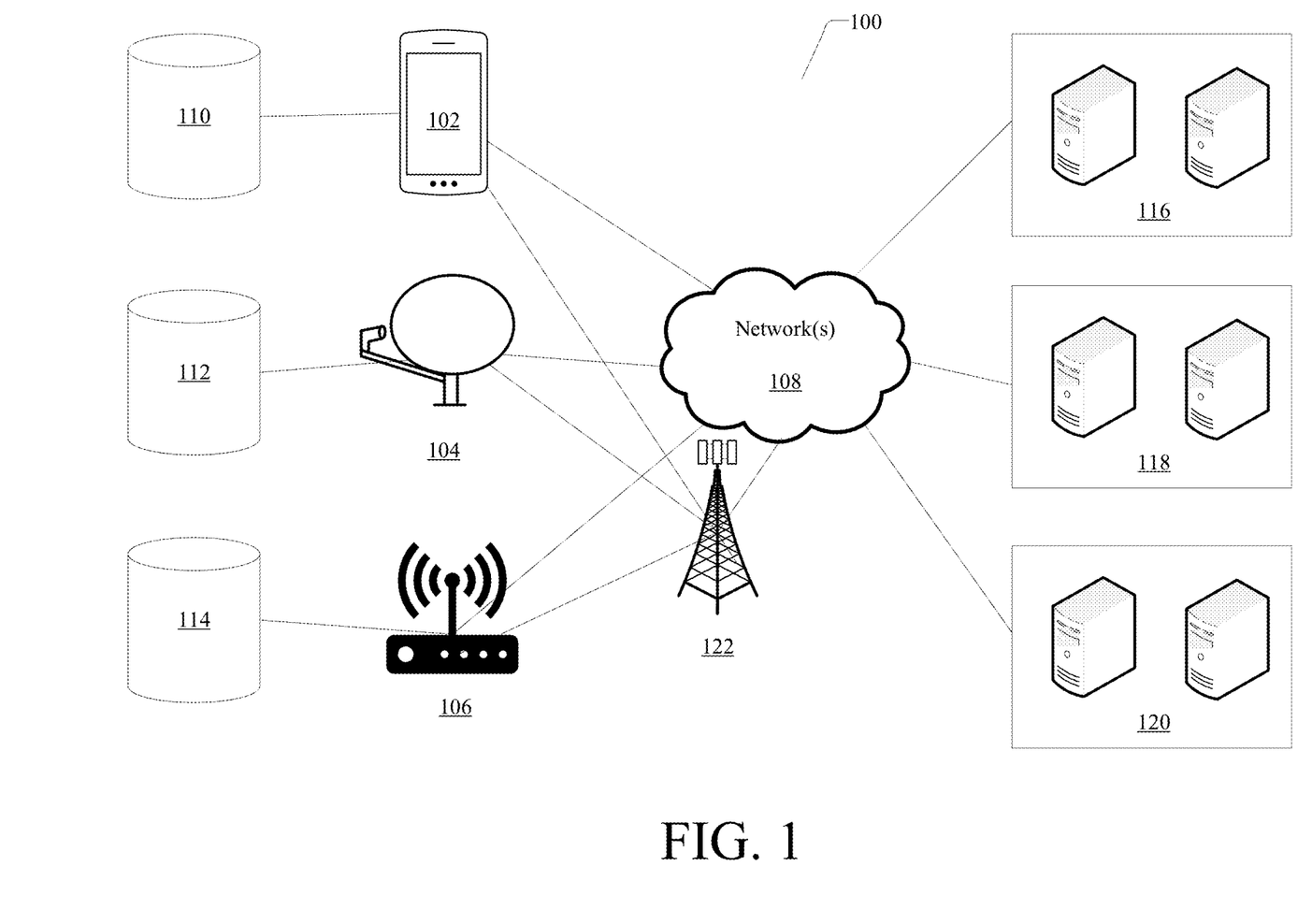
FIG. 1 illustrates an example of a distributed system for identifying an optimal OTA antenna installation location.

FIG. 1 illustrates an example of a distributed system for identifying an optimal OTA antenna installation location. Example system 100 presented is a combination of interdependent components that interact to form an integrated whole for identifying an optimal OTA antenna installation location. Components of the systems may be hardware components or software implemented on, and/or executed by, hardware components of the systems. For example, system 100 comprises client devices 102, 104, and 106, local databases 110, 112, and 114, network(s) 108, and server devices 116, 118, and/or 120.

Client devices 102, 104, and 106 may be configured to receive channel reception feedback associated with an OTA antenna and also identify geolocations of possible installation locations for an OTA antenna. In one example, a client device 102 may be a mobile phone, a client device 104 may be a smart OTA antenna, and a client device 106 may be a broadcast module box (e.g., set-top box). Other possible client devices include but are not limited to tablets, personal computers, televisions, etc. In aspects, a client device, such as client devices 102, 104, and 106, may have access to one or more data sources and/or databases comprising geolocations to install an OTA antenna. In other aspects, client devices 102, 104, and 106, may be equipped to receive live channel reception feedback data. The signals that client devices 102, 104, and 106 may receive may be transmitted from satellite broadcast tower 122. Broadcast tower 122 may also be configured to communicate with network(s) 108, in addition to being able to communicate directly with client devices 102, 104, and 106. In some examples, a client device may be a set-top box that is connected to a display device, such as television (or a television that may have set-top box circuitry built into the television mainframe).

Client devices 102, 104, and 106 may be configured to run software that allows for the simultaneous reception of channel feedback and identification of optimal installation locations for an OTA antenna that may be stored locally on the client device or run remotely via network(s) 108. For example, a client device may receive a signal from broadcast tower 122. The signal may indicate that the channel reception for a certain set of local channels is strong in a particular location. The client device may receive this channel feedback data and geolocation data and subsequently store this data locally in databases 110, 112, and/or 114. In alternative scenarios, the channel feedback data and geolocation data that is recorded may be transmitted from a client device (e.g., client device 102, 104, and/or 106) via network(s) 108 to be stored remotely on server(s) 116, 118, and/or 120. A user may subsequently access the channel feedback and geolocation data from a local database (110, 112, and/or 114) and/or external database (116, 118, and/or 120), depending on where the channel feedback and geolocation data may be stored. The system may be configured to receive and process channel feedback at different geolocations in the background. This may be helpful for a user moving around an area. For example, the user may move to different locations, initiate the channel feedback reception analysis for that particular geolocation, and then move to another location while the analysis in the first location is conducted in the background.

In some example aspects, client devices 102, 104, and/or 106 may be equipped to receive signals from an input device. Signals may be received on client devices 102, 104, and/or 106 via Bluetooth, Wi-Fi, infrared, light signals, binary, among other mediums and protocols for transmitting/receiving signals. For example, a user may use a mobile device 102 to check the channel reception feedback of an OTA antenna (e.g., antenna 104). A graphic user interface may display on the mobile device 102 indicating the signal strength of certain local channels. Specifically, at a particular geolocation, the antenna 104 may receive signals from broadcast tower 122. The antenna 104 may then transmit those signals for analysis via network(s) 108. The results of the analysis may then be displayed on mobile device 102 via network(s) 108. In other examples, the results of the analysis may be displayed on a television device connected to a broadcast module box, such as broadcast module box 106.

In other examples, databases stored on remote servers 116, 118, and 120 may be utilized to assist the system in determining the optimal location to install the OTA antenna. Such databases may contain certain correlated tables of zip codes, available channels, and certain geocoordinates of potential optimal locations to install an OTA antenna. Such data may be transmitted via network(s) 108 to client devices 102, 104, and/or 106 to assist in determining an optimal location to install the OTA antenna.

Because broadcast tower 122 and network(s) 108 are configured to communicate with one another, the systems and methods described herein may be able to assess an optimal geolocation for installation of an OTA antenna. Such geolocation determinations can use Wi-Fi and/or GPS methods to enhance the accuracy of the optimal geolocation. By locating the most optimal geolocation in an area to install an OTA antenna, efficiency for receiving broadcast signals and transforming those signals into broadcast content (e.g., on a television) is increased.

Figure 2:
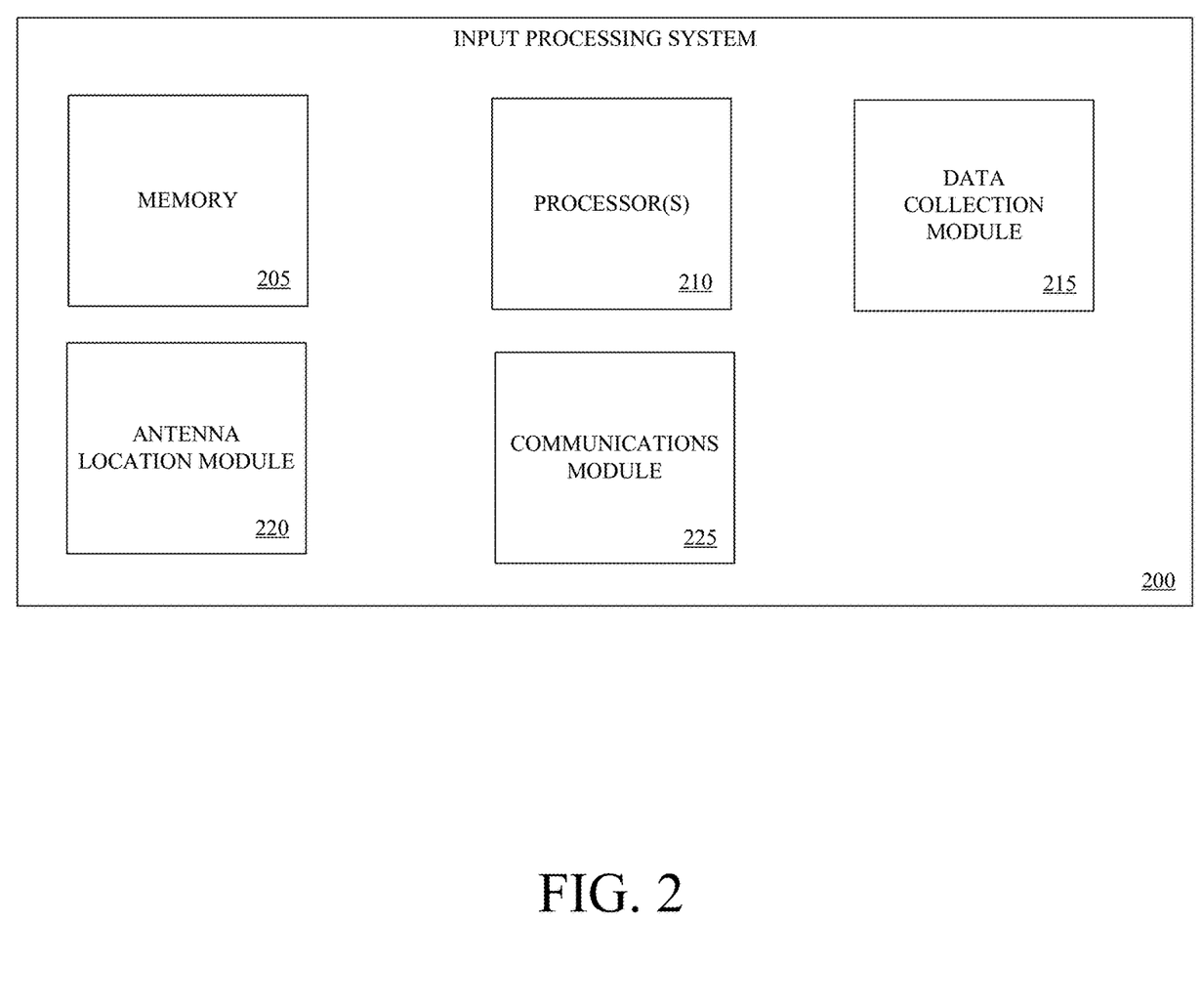
FIG. 2 illustrates an example input processing system for implementing systems and methods for identifying an optimal OTA antenna installation location.

FIG. 2 illustrates an example input processing system for implementing systems and methods for identifying an optimal OTA antenna installation location. The input processing system (e.g., one or more data processors) is capable of executing algorithms, software routines, and/or instructions based on processing data provided by a variety of sources related to identifying an optimal location to install an OTA antenna. The input processing system can be a general-purpose computer or a dedicated, special-purpose computer. According to the embodiments shown in FIG. 2, the disclosed system can include memory 205, one or more processors 210, data collection module 215, antenna location module 220, and communications module 225. Other embodiments of the present technology may include some, all, or none of these modules and components, along with other modules, applications, data, and/or components. Still yet, some embodiments may incorporate two or more of these modules and components into a single module and/or associate a portion of the functionality of one or more of these modules with a different module.

Memory 205 can store instructions for running one or more applications or modules on processor(s) 210. For example, memory 205 could be used in one or more embodiments to house all or some of the instructions needed to execute the functionality of data collection module 215, antenna location module 220, and communications module 225. Generally, memory 205 can include any device, mechanism, or populated data structure used for storing information. In accordance with some embodiments of the present disclosures, memory 205 can encompass, but is not limited to, any type of volatile memory, nonvolatile memory, and dynamic memory. For example, memory 205 can be random access memory, memory storage devices, optical memory devices, magnetic media, floppy disks, magnetic tapes, hard drives, SIMMs, SDRAM, RDRAM, DDR, RAM, SODIMMs, EPROMs, EEPROMs, compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 205. In some example aspects, memory 205 may store at least one database containing channel frequencies cross-referenced with particular zip codes and/or geocoordinates. In other examples aspects, memory 205 may store at least one database of programs cross-referenced with particular channels (e.g., a certain channel broadcasts program X). In yet other example aspects, memory 205 may store previous geocoordinates where a user previously was located when attempting to install an OTA antenna in the most optimal location. Any of the databases that may be stored in memory 205 may be applied to data collected by data collection module 215.

Data collection module 215 may be configured to collect customer, account, and/or device information, along with channel frequency data and geocoordinate information one or more data sources (e.g., third-party databases, OTA antenna location, OTA box, etc.). Data collection module 215 may also be configured to analyze channel frequency data received in real-time by an OTA antenna at a particular geocoordinate. In aspects, input processing system 200 may detect, or otherwise be informed of, devices (e.g., customer devices, user devices, network appliance devices, etc.) that have connected to input processing system 200 or a network thereof. Input processing system 200 may collect and/or store information related to the detected/connected devices and/or the corresponding users. Data collection module 215 may have access to the information collected/stored and may collect or aggregate at least a portion of the collected/stored information. For example, candidate geocoordinate locations for an optimal installation location for an OTA antenna may be collected and stored by the data collection module 215. Alternately, data collection module 215 may interrogate, or otherwise solicit data from, one or more data sources comprising such information. For example, data collection module 215 may have access to data in one or more external systems, such as content systems, distribution systems, marketing systems, user profiles or preference settings, authentication/authorization systems, device manifests, or the like. Specifically, data collection module 215 may have access to a database of optimal geocoordinates cross-referenced to zip codes and addresses, which may inform a user of where to install an OTA antenna initially, thereby saving time of guessing-and-checking the install location of the OTA antenna. Data collection module 215 may use a set of APIs or similar interfaces to communicate requests to, and receive response data from, such data sources. In at least one example, the data collection process of data collection module 215 may be triggered according to a present schedule, in response to a specific user request to collect data (e.g., user indicates to system that the user is at a particular location in the house), or in response to the satisfaction of one or more criteria (e.g., a user's top four channels may be received in the current location of the OTA antenna, indicating to the system that the current location is an optimal installation location for the OTA antenna). Data collection module 215 may also receive information from devices such as OTA boxes, set-top boxes, smart antennas (e.g., smart OTA antenna), and the like. Data collection module 215 may be configured to receive GPS coordinates, real-time broadcast signals from local broadcast towers, and channel frequency and GPS coordinate data from end-user devices (e.g., tablets, mobile devices, smart televisions, etc.).

Antenna location module 220 is configured to identify an optimal location to install an OTA antenna. The antenna location module 220 may be configured to consider a user's top channel preferences, a user's geocoordinates (e.g., GPS coordinates), at least one database of channel frequencies cross-referenced with zip codes and/or geocoordinates, at least one database of programs cross-referenced with channels (e.g., local channels based on zip code broadcasting certain programs at certain times). The antenna location module 220 may also receive real-time channel frequency feedback and provide an indication to the user whether the OTA antenna is presently in an optimal location for receiving certain local OTA channels.

In other example aspects, antenna location module 220 may also receive certain channel frequency data base on present geolocations of a user. For example, if a certain location is not optimal for receiving certain channels via the OTA antenna, then that geolocation may be captured and stored by the antenna location module 220. Such data may also be transmitted from antenna location module 220 to data collection module 215 for future processing. Specifically, in one example aspect, the system described herein may be configured to suggest historically-proven geocoordinates to a user to try as an optimal location to install the OTA antenna.

Antenna location module 220 may also be configured to communicate with local broadcast towers. Such communication may be received and used to indicate to the user which way the OTA antenna should be positioned to obtain the most optimal signal. For example, if a local broadcast tower is on the east side of a house, the antenna location module 220 may identify this location and suggest to the user to position the OTA antenna on the east side of the house for improved odds of obtaining an optimal installation location for the OTA antenna.

Communications module 225 is associated with sending/receiving information (e.g., collected by data collection module 215 and antenna location module 220) with a remote server or with one or more client devices, streaming devices, OTA boxes, set-top boxes, etc. These communications can employ any suitable type of technology, such as Bluetooth, WiFi, WiMax, cellular, single hop communication, multi-hop communication, Dedicated Short Range Communications (DSRC), or a proprietary communication protocol. In some embodiments, communications module 225 sends information collected by data collection module 215 and processed by antenna location module 220. Furthermore, communications module 225 may be configured to communicate a particular optimal OTA antenna installation location from antenna location module 220 to a client device and/or OTA box, smart OTA antenna, and/or smart TV, etc. to indicate to the user an optimal location to install the OTA antenna. Communications module 225 may be configured to transmit that optimal OTA antenna location to the correct device so the user can install the OTA antenna accordingly.

Figure 3:
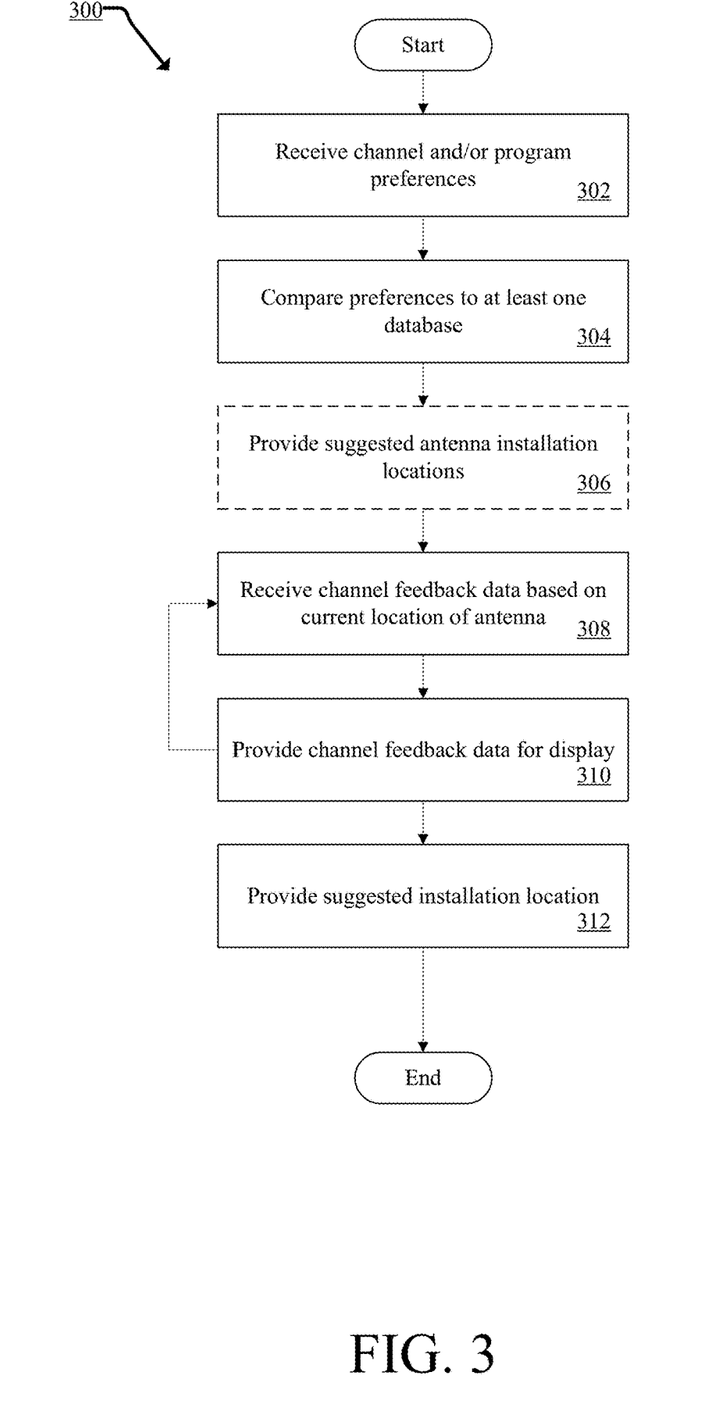
FIG. 3 illustrates an example method for identifying an optimal OTA antenna installation location.

FIG. 3 illustrates an example method for identifying an optimal OTA antenna installation location. Method 300 begins with step 302, receive channel and/or program preferences. In some example aspects, a user may indicate certain channels and/or programs that the user prefers to watch. The system may receive these selections at step 302. For example, prior to setup of the OTA antenna, the system may receive a list of a user's top four local channels that the user enjoys watching. In other examples, the system may receive a list of a user's top five television programs the user enjoys watching.

After the system receives the channel and/or program preferences, the system may compare the preferences to at least one database at step 304. The preferences may be compared to at least one database that houses channel frequencies that are keyed to particular local channels and/or zip codes. In some examples, the at least one database may key certain channel frequencies to exact geocoordinates (e.g., GPS longitude and latitude coordinates). Another database may contain a table mapping certain local channels to programs that are broadcasted on those local channels. At step 304, the system may compare the user's preferences (of channels and/or programs) to at least one database, which will aid the system in identifying an optimal location for installation of the OTA antenna. For instance, the system may compare the user's top four local channels to a database that indicates optimal geolocations for OTA antenna installation for each of the four channels. The system may aggregate those geolocations and find an optimal average location where each of those four local channels may most likely be received by the OTA antenna.

At step 306, the system may provide a suggested OTA antenna installation location to the user. In some examples, this step is optional, as the system may not contain enough data to accurately suggest an optimal location to the user. In the examples where the system has enough data to make a prediction regarding the OTA antenna installation location, the system may provide this information to the user. In some instances, the system may suggest a list of "Top 3" OTA antenna installation locations based on the user's preferences and at least one historical database that indicates optimal locations to receive the user's preferred local channels. In another example, the system may have access to a database that indicates the direction of local broadcast towers in relation to a user's address and/or zip code. The system may suggest that the user install the OTA antenna on a certain side of a property (e.g., house, apartment, etc.) to give the OTA antenna the best chance at receiving the strongest broadcast signals from the local broadcast tower(s).

At step 308, the system may receive channel feedback data based on the current location of the OTA antenna. In some scenarios, the user must manually move around a dwelling with the OTA antenna to check the broadcast signal at the different locations. At each location the user moves to, the system may receive channel feedback data. In some instances, the system will receive all channel feedback for all available local channels in the area. In other instances, the system will receive channel feedback data for the user's identified top local channels. Once the channel feedback data is received at step 308, the system will provide the channel feedback data for display to the user at step 310. For example, a user may be moving around a house with the OTA antenna in one hand and a mobile device (e.g., cell phone, tablet, etc.) in the other hand. The system may receive the channel feedback data from the OTA antenna at a particular location (step 308) and then provide that data on the mobile device, e.g., via a mobile application (step 310). The user will be able to see, in near real-time, local channel feedback data based on the current location of the OTA antenna. In particular, a user may see a graphical user interface of the user's top four indicated local channels with visual indications next to each channel, indicating the signal strength of those channels based on the current location of the OTA antenna. When the user is at a location with the OTA antenna where the channel feedback data shows a strong signal for at least the top four user-indicated local channels, then the user may have arrived at an optimal location to install the OTA antenna.

In other example aspects, the system may receive channel feedback data for only a subset of channels/frequencies from a database of available channels/frequencies. This is in contrast to the tuner scanning the entire frequency band, which takes more time to scan. By selecting only a subset of channels to scan, the system may be able to receive and display channel feedback data in real-time, or at least faster than if the system was scanning all of the available channels in that particular geolocation. In some instances, the subset of channels may be associated with the user's program preferences (e.g., the system may intelligently suggest certain programs and/or channels for the user based on the user's viewing history). In other instances, the subset of channels may be manually input into the system by the user.

In some example aspects, the system may repeat steps 308 and 310 until the system identifies an optimal location to install the OTA antenna. The identification threshold may be based on the user's top four local channel selections, for example. Another threshold may be based on the user's preferred programming. For instance, if a user identified five different programs that the user prefers to watch, the system may first identify the local channels that broadcast those channels (back in step 304) and then prioritize identifying strong signals for those local channels. Once the signal strength for that set of local channels that broadcast the user's preferred programming is strong based on a certain OTA antenna location, the system may move to step 312 and suggest to the user that the user install the OTA antenna at the present location. In some examples, the threshold may be a signal quality threshold, where the threshold indicates the whether a local channel's signal quality is sufficient enough to be received by an OTA antenna and displayed on a device.

At step 312, the system may recommend a location to install the OTA antenna. The suggested installation location at step 312 is provided to the user after the system has received recent data about the user's location and the channel feedback data based on the OTA antenna location history during installation. This data is combined to conclude an optimal installation location to the user. For example, the location that shows each of the top four user-indicated local channels having a strong broadcast signal might be the location the system suggests to the user to install the OTA antenna. In another example, the system may have received two different locations where the top four user-indicated local channels had strong signals, but one of the two locations also showed strong signals for more local channels compared to the other location. As such, the system may suggest to the user to install the OTA antenna in the location where the signal strength for the most local channels is the strongest, even though another location may also provide strong signal strength for the top four user-indicated local channels.

Figure 4:
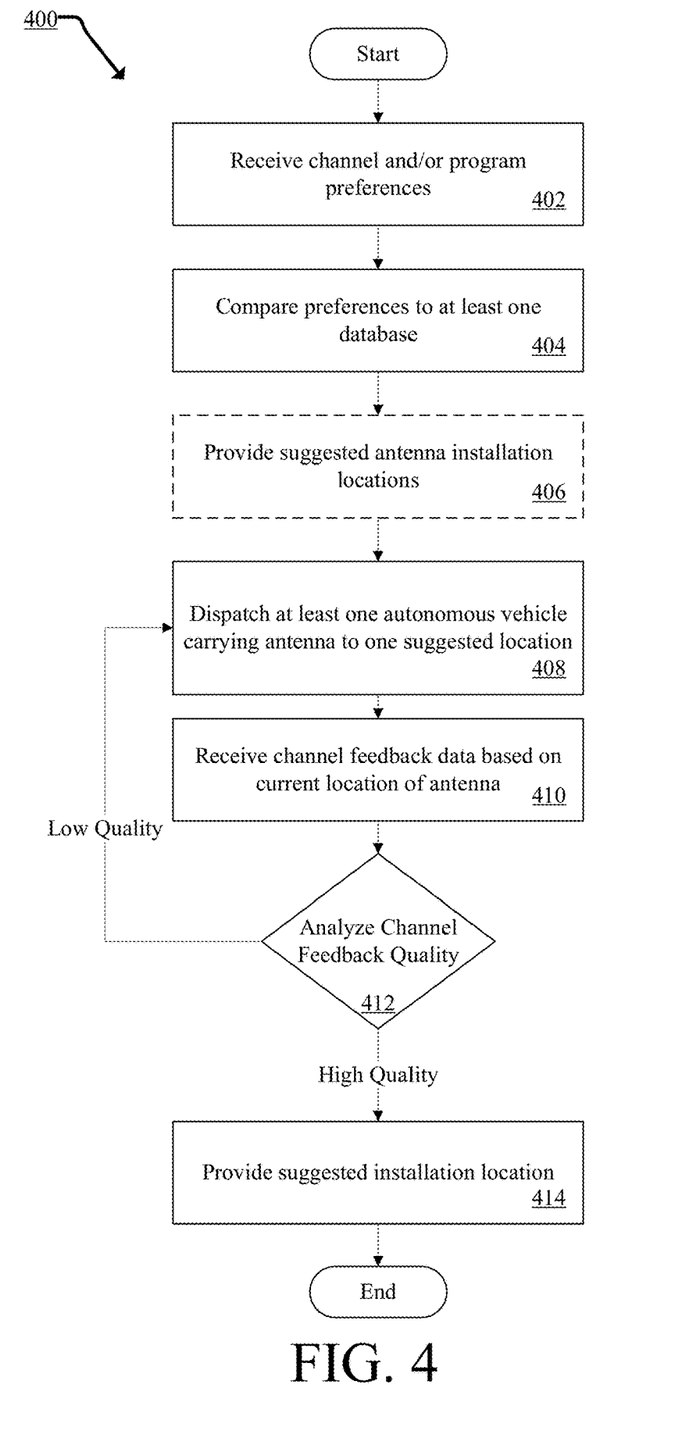
FIG. 4 illustrates an example method for identifying an optimal OTA antenna installation location using at least one autonomous vehicle.

FIG. 4 illustrates an example method for identifying an optimal OTA antenna installation location using at least one autonomous vehicle. Method 400 is similar to method 300, in that the first three steps of the method are the same. Step 402 is receive channel and/or program preferences. Step 404 is compare the preferences to at least one database (e.g., database of frequencies keyed to channels, zip codes, and/or geocoordinates; database of programs keyed to local channels based on zip codes; etc.). Step 406 is an optional step of providing suggested antenna installation locations 406 based on information the system receives prior to installation of the OTA antenna (e.g., user's address, GPS location, preferred channels, preferred programming, locations of local broadcast towers, etc.).

Method 400 deviates from method 300 at step 408. Instead of a user manually moving around a dwelling (e.g., house, apartment, etc.) with a device displaying the channel feedback quality of certain local channels in real-time (or near real-time), the OTA antenna is moved to different locations in a dwelling via an autonomous vehicle. The autonomous vehicle may be a small unmanned aircraft, such as a drone, or in other examples, the vehicle may be a robot with wheels and a platform where the OTA antenna rests while the robot is in movement. At step 408, the autonomous vehicle is carrying the OTA antenna to different locations that may be suggested to the autonomous vehicle by the system. The suggested location may derive from certain locations based on step 406, where historical databases are used to predict optimal installation locations of the OTA antenna based on an average signal strength at historical installation locations. In other examples, the suggested locations may be based on real-time channel feedback data the system receives from each location the OTA antenna is placed by the autonomous vehicle. For instance, the autonomous vehicle may move to three locations—location A, B, and C. If OTA antenna receives strong signals for three of the four user-indicated preferred local channels at location A and C but only receives strong signals for two of the four channels at location B, then the system may recalculate a new suggested location for the autonomous vehicle to move to based on the proximity to locations A and C and not B, since locations A and C indicated stronger signals for the user-indicated preferred local channels than location B.

At each location the autonomous vehicle moves to, the OTA antenna receives local broadcast signals. Those local broadcast signals are then analyzed by the system. At step 410, these signals are translated into channel feedback data that the system receives and analyzes. Based on the channel feedback data in relation to the current position of the OTA antenna, the system either suggests that the autonomous vehicle move to a new location or suggests that the OTA antenna be installed at the present location. At decision 412, the channel feedback quality is analyzed. If the channel feedback quality is low, then the system may repeat steps 408, 410 and 412 again. If the channel feedback quality is high, then the system may move to step 414, where the system suggests (e.g., to the user) that the OTA antenna be installed in the present location.

In some examples, the determination of whether to install the OTA antenna in the present location or repeat steps 408-412 is based on the signal strength of the user's preferred local channels (e.g., the top four local channels the user indicated to the system prior to the installation process). In other examples, the determination of an installation location of an OTA antenna may be based on a user's indicated programming preferences. In such a situation, the system may cross-reference at least one database that correlates certain television programs with particular local channels that broadcast those programs. The system may then indicate an optimal installation location of the OTA antenna based on the signal strength of the identified local channels that frequently broadcast the user's preferred television programs.

At step 414, the system may indicate to the user that the autonomous vehicle has arrived at an optimal installation location for the OTA antenna. The user may then remove the OTA antenna from the autonomous vehicle and proceed to install the OTA antenna. In other examples, the autonomous vehicle may be equipped with the requisite hardware and software components to automatically install the OTA antenna once the system identifies the optimal installation location. In such a scenario, a user may not be required to install the OTA antenna. The system may provide the suggested installation location to the autonomous vehicle, and the autonomous vehicle may proceed to install the OTA antenna at the suggested installation location.

Figure 5:
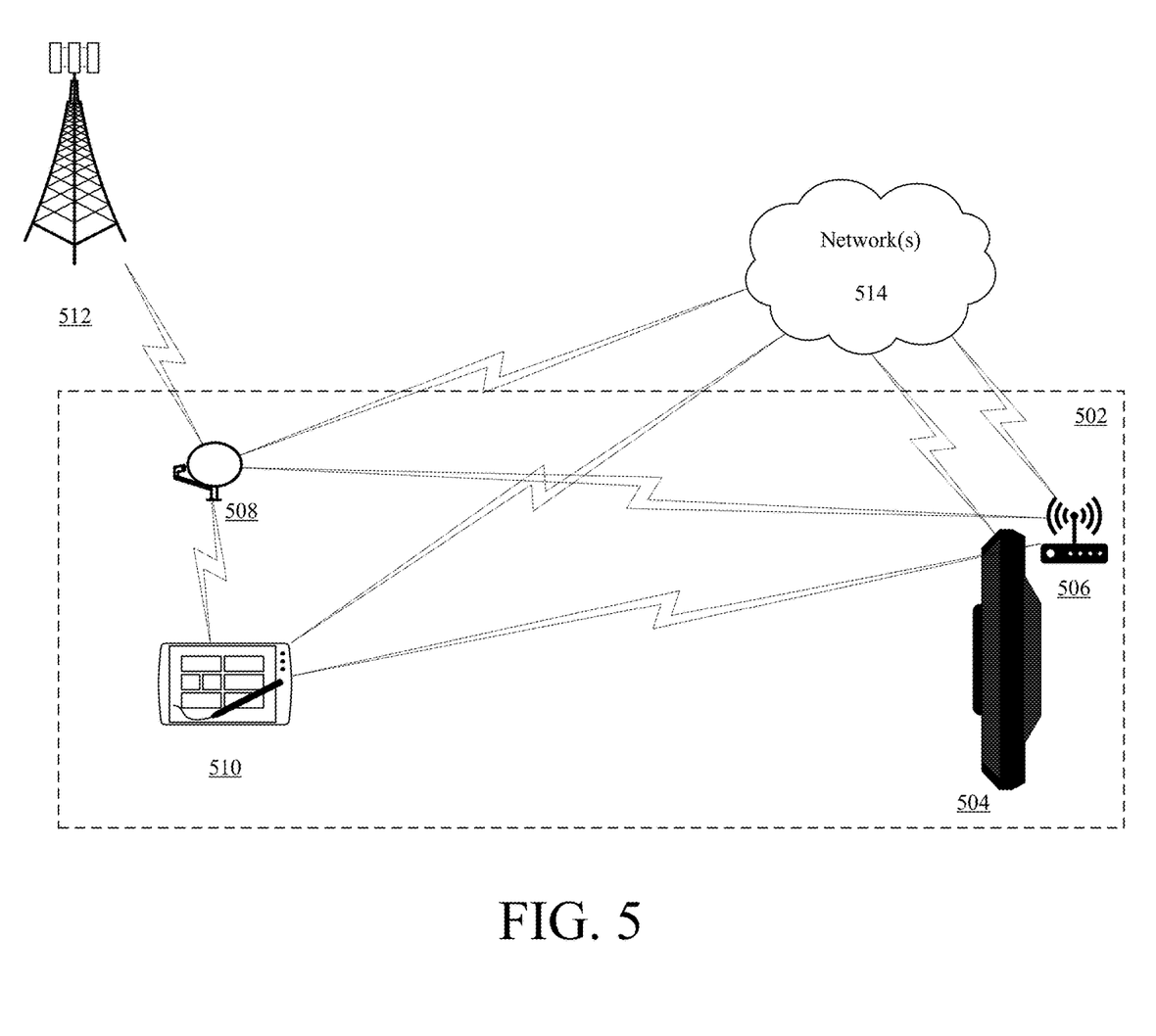
FIG. 5 illustrates an example environment of operation of the disclosed technology.

FIG. 5 illustrates an example environment of operation of the disclosed technology. In the example environment illustrated in FIG. 5, area 502 may represent a house, a commercial building, an apartment, a condo, or any other type of suitable dwelling. Inside area 502 is at least one television 504, an OTA box 506, an OTA antenna 508, and a mobile device 510. Each of these devices may be configured to communicate with network(s) 514. Network(s) 514 may be a WiFi network and/or a cellular network. The OTA antenna 508 may also be configured to receive local broadcast signals from local broadcast tower 512.

Within area 502, a user may be moving around with the OTA antenna 508 and mobile device 510. The OTA antenna 508 may be constantly receiving local broadcast signals from broadcast tower 512. The OTA antenna 508 may then transmit those signals to OTA box 506, which may then transmit those signals to network(s) 514 for processing. In other examples, the OTA antenna 508 may be configured to receive the local broadcast signals from broadcast tower 512 and also communicate those signals directly to network(s) 514 for processing. In particular, the local broadcast signals received by the OTA antenna 508 may be transmitted to local and/or remote server(s) via network(s) 514. The signals may then be analyzed to determine if certain local channels are able to be received at the present location of the OTA antenna 508. The visual depiction of the signal strength of these local channels may be displayed on mobile device 510. The data regarding the local channel signal strength may be provided to mobile device 510 via network(s) 514. In some embodiments, OTA antenna 508 may be a smart OTA antenna that can receive local broadcast signals, process them locally, and provide the processing results directly to mobile device 510 (e.g., via Bluetooth or other near-distance communication protocol) for display. In other examples, the local broadcast signals may be processed locally at OTA box 506 and subsequently provided to mobile device 510 (e.g., via Bluetooth or other near-distance communication protocol).

Once the system has determined that the OTA antenna is in an optimal location for receiving local channels, the system may indicate to the user that the present location is the location in which the OTA antenna should be installed. The system may determine an optimal location for installation based on different thresholds (e.g., signal quality threshold). For example, the system may solicit a group of local channels that the user prefers to watch prior to installation. The system may then prioritize those channels during installation. For instance, a certain location may reveal strong signal strength for several local channels, but those local channels may not comprise all of the user's preferred local channels. As such, that location is not optimal. A different location may reveal strong signal strength for lesser local channels than the other location, but if the different location shows strong signal strength for all of the user's preferred local channels, then the system may indicate that the present location is an optimal installation location for the OTA antenna.

In other examples, the system may solicit from the user a list of preferred television programs as opposed to preferred local channels. This information may provide the system more flexibility in determining an optimal OTA antenna installation location, as the system will likely be able to choose among a greater pool of local channels based on the programs that are frequently broadcasted on those local channels. According to information received by the system from a database that cross-references programming with local channels, the system may identify a subset of local channels that broadcast the user's preferred programs the most and prioritize the signal strength for that subset of local channels during the installation process of the OTA antenna. In the scenario where a user does not provide the system with preferred channels and/or programming, the system may default to a "local maxima" setting, in which the system identifies the geolocation where the OTA antenna will receive the most local channels with the strongest broadcast signal and indicate to the user that such a location is the optimal installation location for the OTA antenna.

In yet further examples, the system may also compare a user's preferred local channels and/or programming with channels and programs offered through streaming services (e.g., Internet-streaming, on-demand, etc.). Such media may be delivered via network(s) 514 rather than local broadcast tower 512 and OTA antenna 508. If a certain user-indicated channel and/or program is also offered via an Internet-streaming service, the system may suggest to the user that the user obtain that content via the Internet-streaming service instead of the OTA service. This suggestion, if accepted by the user, may increase the optimal locations for the OTA antenna installation because at least one less channel and/or program will be considered a priority by the system. Specifically, if a user selects four top local channels, but one of those channels is offered via an Internet-streaming service, the user may elect to receive the local channel via the Internet-streaming service, thereby reducing the number of local channels needed to be received by the OTA antenna from four to three. A particular OTA antenna location that shows strong broadcast signals for three of the four local channels may now serve as an optimal installation location if the fourth channel (with a weak OTA broadcast signal) may be received via an Internet-streaming service instead of OTA.

Figure 6:
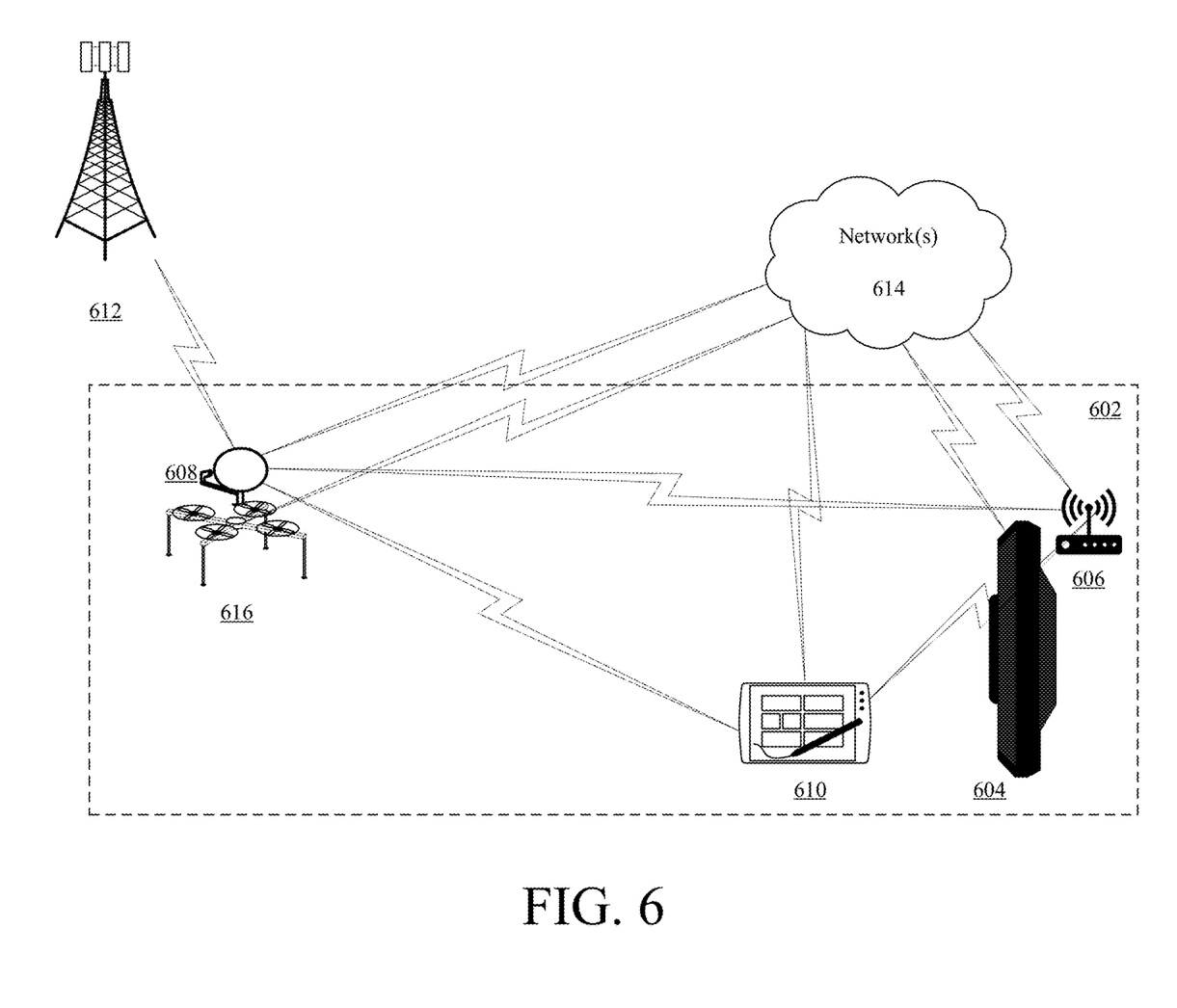
FIG. 6 illustrates an example environment of operation of the disclosed technology using at least one autonomous vehicle.

FIG. 6 illustrates an example environment of operation of the disclosed technology using at least one autonomous vehicle. FIG. 6 is similar to FIG. 5 with the primary difference being the addition of an autonomous vehicle 616. In the example environment illustrated in FIG. 6, area 602 may represent a house, a commercial building, an apartment, a condo, or any other type of suitable dwelling. Inside area 602 is at least one television 604, an OTA box 606, an OTA antenna 608, and a mobile device 610. Additionally, at least one autonomous vehicle 616 may be in area 602, which is carrying/housing OTA antenna 608. Each of these devices may be configured to communicate with network(s) 614. Network(s) 614 may be a WiFi network and/or a cellular network. The OTA antenna 608 may also be configured to receive local broadcast signals from local broadcast tower 612.

In the environment depicted in FIG. 6, the OTA antenna is transported to various locations in area 602 by autonomous vehicle 616. Rather than a human user manually moving the OTA antenna to different locations in an area 602 and constantly checking a mobile device to perceive the near real-time signal strength from the broadcast tower 612, the autonomous vehicle 616 may move the OTA antenna 608 to different locations and subsequently receives instructions from the system (e.g., via network(s) 614) regarding which location(s) to try next for an optimal installation location or regarding a command to install the OTA antenna at the present location.

In some scenarios, the OTA antenna 608 may be a smart antenna that receives the broadcast signals from local broadcast tower 612, processes those signals, and provides the processing results directly to autonomous vehicle 616 (e.g., via Bluetooth, a direct wired connection between the OTA antenna 608 and the autonomous vehicle 616, etc.). In other examples, the system instructions received by the autonomous vehicle 616 may be transmitted via network(s) 614, mobile device 610, and/or OTA box 606. For instance, a user may override certain system instructions to the autonomous vehicle 616 by sending a signal to the autonomous vehicle 616 via mobile device 610 (e.g., a user command to stop operations).

Figure 7:
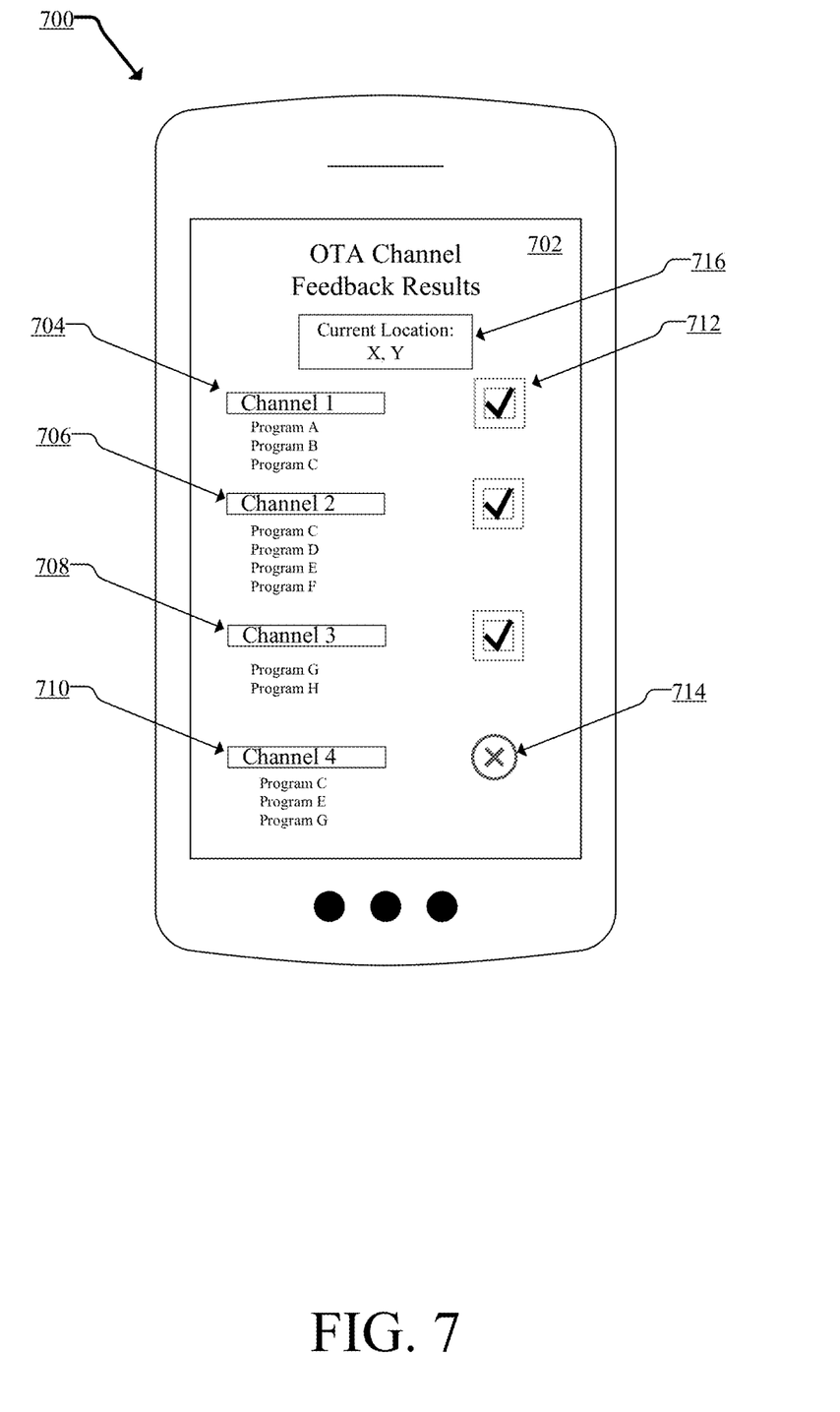
FIG. 7 illustrates an example graphical user interface of OTA channel feedback results.

FIG. 7 illustrates an example graphical user interface of OTA channel feedback results. Mobile device 700 may display a graphical user interface (GUI) that displays to a user the signal strength of certain local channels based on the present location of the OTA antenna. The GUI may aid the user in finding the optimal installation location for the OTA antenna. In this example, the GUI may display a software program 702 (e.g., a mobile application). The program 702 displays a list of channels (channels 704, 706, 708, and 710). These local channels may be local channels that the user indicated as preferred channels when the user initially began setup with the OTA system. In alternative embodiments, these channels may be local channels that most frequently broadcast the user's preferred television programs (which the user may have also provided to the system during initial setup). In yet further examples, the list of local channels may be the most-watched local channels based on the current geolocation, or the list of local channels may be sponsored local channels, in which a local channel paid the OTA system to be featured at the top of the list during the OTA antenna setup phase.

In addition to the list of channels 704-710, the program 702 may also display the OTA antenna location 716, which may be indicated as an X, Y geocoordinate at the top of the screen. The X, Y geocoordinate may be a GPS latitude-longitude coordinate. Further, signal strength indicators that correlate with each of the channels in the list may be displayed to the user. A strong signal indicator 712 may be in the form of a checkmark or a green color, indicating to the user that the particular local channel may be received at the present OTA antenna location. A weak signal indicator 714 may be in the form an "X" or a red color, indicating to the user that the particular local channel may not be received (or partially received but with errors in the broadcast, e.g., detriments to video and/or audio quality).

The program 702 may also display enriched metadata associated with each of the local channels. For example, each of the channels displayed in FIG. 7 show certain programming underneath each channel. These programs may indicate to the user which local channels the user may want to receive OTA. For example, if a user indicated channels 704-710 were preferred but then realized that the top three programs broadcast on channel 4 (710) are also top programs broadcast on one of the other three channels (704, 706, 708), then the user may deprioritize channel 4 (710). In other words, an optimal installation location of the OTA antenna does not require a strong signal reception of channel 4 (710) because the most frequent programs broadcast on channel 4 (710) are also broadcast on the other three local channels, which may have strong signals in the present location of the OTA antenna. As such, the present location of the OTA antenna may then be determined to be an optimal installation location.

Other enriched metadata that may be displayed on program 702 includes channel logos, channel descriptions, top trending programs, programs being broadcasted at the present moment, etc. Such metadata may enable the user to narrow down the required local channels to be received, thereby speeding up the OTA antenna installation process.

Figure 8:
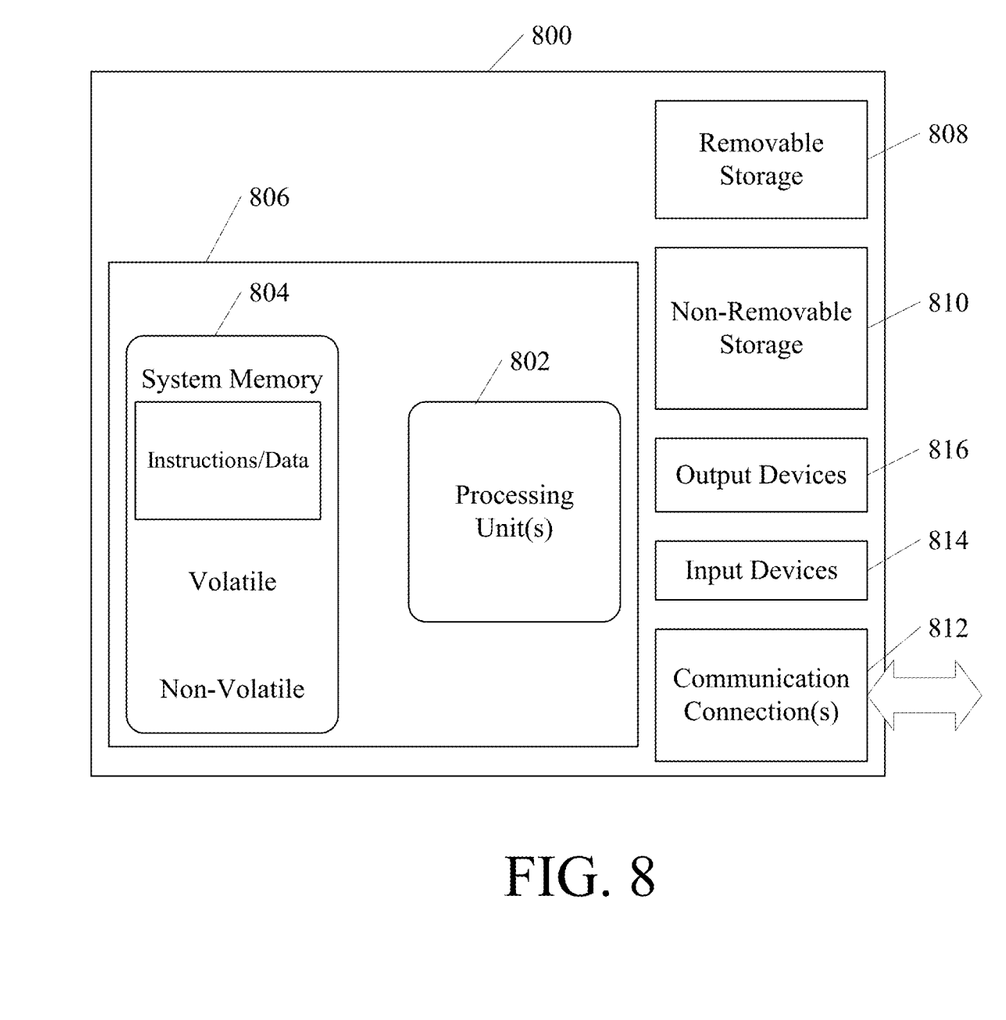
FIG. 8 illustrates one example of a suitable operating environment in which one or more of the present embodiments may be implemented.

FIG. 8 illustrates one example of a suitable operating environment in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, handheld or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 800 typically includes at least one processing unit 802 and memory 804. Depending on the exact configuration and type of computing device, memory 804 (storing, among other things, information related to detected devices, compression artifacts, association information, personal gateway settings, and instruction to perform the methods disclosed herein) may be volatile (such as RAM), non-volatile (such as ROM, flash memory, etc.), or some combination of the two. This most basic configuration is illustrated in FIG. 8 by dashed line 806. Further, environment 800 may also include storage devices (removable 808 and/or non-removable 810) including, but not limited to, magnetic or optical disks or tape. Similarly, environment 800 may also have input device(s) 814 such as keyboard, mouse, pen, voice input, etc., and/or output device(s) 816 such as a display, speakers, printer, etc. Also included in the environment may be one or more communication connections, 812, such as Bluetooth, WiFi, WiMax, LAN, WAN, point to point, etc.

Operating environment 800 typically includes at least some form of computer readable media. Computer readable media can be any available media that can be accessed by processing unit 802 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM EEPROM, flash memory or other memory technology, CD-ROM, digital versatile disks (DVD) or other optical storage, magnetic cassettes, magnetic tape, magnetic disk storage, or other magnetic storage devices, or any other tangible medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulate data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The operating environment 800 may be a single computer (e.g., mobile computer) operating in a networked environment using logical connections to one or more remote computers. The remote computer may be a personal computer, a server, a router, a network PC, a peer device, an OTA antenna, a set-top box, or other common network node, and typically includes many or all of the elements described above as well as others not so mentioned. The logical connections may include any method supported by available communications media. Such networking environments are commonplace in offices, enterprise-wide computer networks, intranets, and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of the claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and the alternate aspects falling within the spirit of the broader aspects of the general inventive concept embodied in this application that do not depart from the broader scope of the claimed disclosure.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A system comprising:
   at least one processor; and
   memory coupled to the at least one processor, the memory comprising computer executable instructions that, when executed by the at least one processor, performs a method comprising:
   receiving channel feedback data associated with at least one local channel and a first location;
   displaying the channel feedback data associated with the at least one local channel at the first location;
   comparing the channel feedback data associated with the at least one local channel to at least one signal quality threshold identifying a second location;
   when the comparison of the channel feedback data associated with the at least one local channel indicates the channel feedback data exceeds the at least one signal quality threshold, identifying at least one installation location for an over-the-air antenna,
   instructing at least one autonomous vehicle carrying the over-the-air antenna to move to the second location, when an evaluation of a signal strength of the at least one local channel indicates the signal strength is weak.

2. The system of claim 1, further comprising:
   receiving at least one local channel preference; and
   comparing the at least one local channel preference to at least one database.

3. The system of claim 2, wherein the at least one local channel preference is a list of at least four local channels.

4. The system of claim 2, wherein the at least one database is a database of channel frequencies, local channel numbers, and geolocations.

5. The system of claim 4, wherein the geolocations comprise at least one of: ZIP codes, addresses, and GPS coordinates.

6. The system of claim 2, wherein the at least one database comprises directional data identifying at least one local broadcast tower in relation to a current location.

7. The system of claim 2, wherein the at least one database is a database of local channels and frequent programs broadcasted on the local channels.

8. The system of claim 2, wherein comparing the channel feedback data associated with the at least one local channel to at least one signal quality threshold further comprises evaluating a signal strength for the at least one local channel preference.

9. The system of claim 8, further comprising:
when the signal strength for the at least one local channel preference exceeds the at least one signal quality threshold, identifying at least one installation location for an over-the-air antenna.

10. The system of claim 2, wherein the at least one local channel preference is a list of television programs.

11. The system of claim 1, wherein identifying the at least one installation location of the over-the-air antenna is based on at least one current location and a local maximum of local channels able to be received over-the-air at the at least one current location.

12. The system of claim 1, wherein displaying the channel feedback data associated with the at least one local channel comprises at least one of: a channel logo, a channel description, a list of programs, and at least one description of a program.

13. A computer-implemented method for identifying an optimal installation location for an over-the-air antenna comprising:
receiving channel feedback data associated with at least one local channel and a first location;
evaluating signal strength of the at least one local channel at the first location;
displaying at least one result of the evaluation of the signal strength of the at least one local channel at the first location;
when the evaluation of the signal strength of the at least one local channel indicates the signal strength is weak, identifying a second location, wherein identifying the second location comprises instructing at least one autonomous vehicle to move to the second location, and wherein the at least one autonomous vehicle carries the over-the-air antenna; and
when the evaluation of the signal strength of the at least one local channel indicates the signal strength is strong, identifying an installation location for the over-the-air antenna.

14. The method of claim 13, wherein the at least one autonomous vehicle is at least one of: a drone and a robot.

15. The method of claim 13, further comprising:
receiving at least one local channel preference; and
comparing the at least one local channel preference to at least one database.

16. The method of claim 15, further comprising:
comparing the at least one local channel preference to at least one program offering associated with an Internet-streaming service; and
if the at least one local channel preference is listed in the at least one program offering associated with the Internet-streaming service, displaying at least one notification indicating the at least one local channel preference is available via the Internet-streaming service.

17. The method of claim 15, wherein the at least one database comprises historical geolocations of OTA antenna installation locations and an average signal strength at each of the historical geolocations.

18. The method of claim 17, wherein comparing the at least one local channel preference to the at least one database further comprises identifying at least one predicted installation location of the OTA antenna based on at least one historical geolocation from the at least one database.

19. A non-transitory computer-readable media storing computer executable instructions that when executed cause a computing system to perform a method comprising:
receiving at least one local channel preference;
comparing the at least one local channel preference to at least one database, wherein the at least one database comprises local channel frequencies, geolocations, and directional data associated with at least one broadcast tower;
based in the comparison of the at least one local channel preference to the at least one database, identifying at least one predicted installation location for an over-the-air antenna;
receiving channel feedback data associated with the at least one local channel preference at the at least one predicted installation location;
evaluating signal strength of the at least one local channel preference at the at least one predicted installation location;
displaying at least one result of the evaluation of the signal strength of the at least one local channel preference at the at least one predicted installation location;
when the evaluation of the signal strength of the at least one local channel preference indicates the signal strength is weak, identifying a location for installation of the over-the-air antenna; and
when the evaluation of the signal strength of the at least one local channel preference indicates the signal strength is strong, indicating the at least one predicted installation location is at least one optimal installation location for the over-the-air antenna.

* * * * *